US011229884B2

(12) United States Patent
Liu et al.

(10) Patent No.: US 11,229,884 B2
(45) Date of Patent: Jan. 25, 2022

(54) ASYMMETRIC POLYVINYLIDINE CHLORIDE MEMBRANES AND CARBON MOLECULAR SIEVE MEMBRANES MADE THEREFROM

(71) Applicant: Dow Global Technologies LLC, Midland, MI (US)

(72) Inventors: Junqiang Liu, Midland, MI (US); Liren Xu, Freeport, TX (US); Troy D. Wolford, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 126 days.

(21) Appl. No.: 16/500,649

(22) PCT Filed: Mar. 14, 2018

(86) PCT No.: PCT/US2018/022342
§ 371 (c)(1),
(2) Date: Oct. 3, 2019

(87) PCT Pub. No.: WO2018/187004
PCT Pub. Date: Oct. 11, 2018

(65) Prior Publication Data
US 2020/0114316 A1   Apr. 16, 2020

Related U.S. Application Data

(60) Provisional application No. 62/482,459, filed on Apr. 6, 2017.

(51) Int. Cl.
*B01D 67/00* (2006.01)
*B01D 53/22* (2006.01)
(Continued)

(52) U.S. Cl.
CPC ....... *B01D 67/0009* (2013.01); *B01D 53/228* (2013.01); *B01D 67/0067* (2013.01);
(Continued)

(58) Field of Classification Search
None
See application file for complete search history.

(56) References Cited

U.S. PATENT DOCUMENTS

| 4,113,628 | A | 9/1978 | Alegranti |
| 4,378,324 | A | 3/1983 | Makino et al. |

(Continued)

FOREIGN PATENT DOCUMENTS

| WO | 2016003680 A1 | 1/2016 | |
| WO | WO 2016003680 A1 * | 1/2016 | .............. B01J 20/20 |
| WO | 2016048479 A1 | 3/2016 | |

OTHER PUBLICATIONS

Lamond et al., "6 molecular sieve properties of SARAN-type carbons," Carbon (1965) 3, 59-63.
(Continued)

*Primary Examiner* — Jason M Greene
(74) *Attorney, Agent, or Firm* — Dinsmore & Shohl LLP

(57) ABSTRACT

An asymmetric polyvinylidene chloride copolymer membrane is made by a method using a dope solution comprised of a polyvinylidene chloride copolymer and a solvent that solubilizes the polyvinylidene chloride copolymer that is shaped to form an initial shaped membrane. The initial shaped membrane is then quenched in a liquid comprised of a solvent that is miscible with the solvent that solubilizes the polyvinylidene chloride copolymer but is immiscible with the polyvinylidene chloride copolymer to form a wet asymmetric polyvinylidene chloride copolymer membrane. The solvents are removed from the wet membrane to form the asymmetric polyvinylidene chloride (PVDC) copolymer (Continued)

membrane. The membrane then may be further heated to form a carbon asymmetric membrane in which the porous support structure and separation layer of the PVDC membrane is maintained. The asymmetric carbon membrane may be useful to separate gases such as olefins from their corresponding paraffins, hydrogen from syngas or cracked gas, natural gas or refinery gas, oxygen/nitrogen, or carbon dioxide and methane.

16 Claims, 2 Drawing Sheets

(51) Int. Cl.
  *B01D 69/08*   (2006.01)
  *B01D 69/10*   (2006.01)
  *B01D 71/02*   (2006.01)
  *B01D 71/30*   (2006.01)

(52) U.S. Cl.
  CPC ............ *B01D 69/08* (2013.01); *B01D 69/10* (2013.01); *B01D 71/021* (2013.01); *B01D 71/30* (2013.01); *B01D 2323/08* (2013.01); *B01D 2325/022* (2013.01); *B01D 2325/20* (2013.01)

(56) References Cited

U.S. PATENT DOCUMENTS

| | | |
|---|---|---|
| 4,460,526 A | 7/1984 | Makino et al. |
| 4,474,662 A | 10/1984 | Makino et al. |
| 4,485,056 A | 11/1984 | Makino et al. |
| 4,512,893 A | 4/1985 | Makino et al. |
| 4,717,394 A | 1/1988 | Hayes |
| 5,820,659 A | 10/1998 | Ekiner et al. |
| 2015/0053079 A1 | 2/2015 | Koros et al. |
| 2017/0274327 A1* | 9/2017 | Koros ................ B01D 67/0067 |
| 2019/0076793 A1 | 3/2019 | Liu et al. |

OTHER PUBLICATIONS

Centeno et al., "Carbon Molecular sieve gas separation membranes based on poly(vinylidene chloride-co-vinyl chloride)," Carbon (2000) 38, 1067-1073.

Ismail et al., "Review on the Development of Defect-Free and Ultrathin-skinned Asymmetric Membranes for Gas Separation through Manipulation of Phase Inversion and Rheological Factors", J. Appl. Polymer Sci. (2003) vol. 88, 442-451.

Laredo et al., "Adsorption equilibrium and kinetics of branched octane isomers on a polyvinylidene chloride-based carbon molecular sieve," Energy Fuels, 2008, 22 (4) 2641-2648.

Xu et al., "Matrimid Derived Carbon Molecular Sieve Hollow Fiber Membranes for Ethylene/Ethane Separation", Journal of Membrane Science, 2011, 380, 138-147.

International Search Report and Written Opinion pertaining to PCT/US2018/022342, dated Jul. 23, 2018.

Koh et al., "Sub-Angstiom Molecular Differentiation of Organic Liquids Using Carbon Molecular Sieve Membranes", School of Chemical & Biomolecular Engineering, Georgia Institute of Technology; Separations & Process Chemistry, Corporate Strategic Research, ExxonMobil Research and Engineering, pp. 1-2.

Rao et al., "Nanoporous Carbon Membranes for Separation of Gas Mixtures by Selective Surface Flow", Journal of Membrane Science, 1993, 85, 253-264.

\* cited by examiner

ASYMMETRIC POLYVINYLIDINE CHLORIDE MEMBRANES AND CARBON MOLECULAR SIEVE MEMBRANES MADE THEREFROM

FIELD OF THE INVENTION

The invention relates to carbon molecular sieve (CMS) membranes for use in gas separation. In particular the invention relates to CMS membranes made from particular polyvinylidine chloride (PVDC) membranes and the method to form the PVDC membranes.

BACKGROUND OF THE INVENTION

Membranes are widely used for the separation of gases and liquids, including for example, separating acid gases, such as $CO_2$ and $H_2S$ from natural gas, and the removal of $O_2$ from air. Gas transport through such membranes is commonly modeled by the sorption-diffusion mechanism. Currently, polymeric membranes are well studied and widely available for gaseous separations due to easy process-ability and low cost. CMS membranes, however, have been shown to have attractive separation performance properties exceeding that of polymeric membranes.

Carbon molecular sieves (CMS) and CMS membranes have been used to separate gases. CMSs may be prepared from a variety of resins, but commonly are a polyimide, that are pyrolyzed at various temperatures and/or under various conditions. The pyrolysis reduces the resins to carbon, but maintains at least some porosity, in the form of micropores, in the pyrolyzed product. The CMSs thus formed may then be employed in conventional gas separations equipment employing adsorption of particular gases, such as packed beds, columns, and the like, where the micropore size determines which gas in a gas mixture is adsorbed and which is not. Adsorption and desorption techniques may be alternated to carry out the separation, according to, for example, conventional pressure swing or temperature swing adsorption methods.

Preferably though, the CMS membranes have been used to separate gases by flowing gas mixtures through the CMS membranes and commonly the CMS membranes are asymmetric membranes derived from a polymer resin. An asymmetric membrane herein is one that has a dense thin separating layer integrally supported by a porous layer. The structural asymmetry enables the membrane to have sufficient structural integrity without compromising the productivity of the membrane. Asymmetric membranes are formed from the resin and when pyrolyzed form CMS membranes tending to mimic the microstructure of the asymmetric resin membrane, but a significant problem is the structural collapse and thickening of the dense separating layer due to consolidation or sintering during carbonization, (see L. Xu, et al. Journal of Membrane Science, 380 (2011), 138-147).

Asymmetric resin membranes typically are formed by phase inversion. Phase inversion involves the quenching of a multicomponent solution comprised of solvent and dissolved resin into a coagulant, which is miscible with the solvents, but not the resin. Due to phase instability arising from the counter diffusion of the solvents and nonsolvents for the resin, an asymmetric structure results (see, for example, A.F. Ismail and L. P. Yean, J. Appl. Polymer Sci. Vol. 88, 442-451 (2003)).

Polyvinylidine chloride (PVDC) copolymers have been pyrolyzed to form carbon molecular sieves, but they have tended to form larger pores. Lamond T. G., et al., "6 Å molecular sieve properties of SARAN-type carbons," Carbon (1965) 3, 59-63. This article describes preparation of a CMS, from a polyvinylidene chloride (PVDC) copolymer, that rejects neopentane (6.0 Å) molecules, but adsorbs smaller molecules, such as, in non-limiting example, $CO_2$, butane, and iso-butane, non-selectively. In view of this the authors of that article concluded that their CMS had 6 Å micropores.

Another example is disclosed in T. A. Centeno., et al., "Molecular sieve gas separation membranes based on poly (vinylidene chloride-co-vinyl chloride)," Carbon (2000) 38, 1067-1073. This article describes preparation of a composite carbon membrane using the aforesaid material. The membrane is formed with a thin microporous carbon layer (thickness of 0.8 micrometers, μm) obtained by pyrolysis of the polymeric film, supported over a macroporous carbon substrate (pore size 1 μm; macroporosity 30 percent, %). Single gas permeation experiments include helium (He), $CO_2$, oxygen ($O_2$), nitrogen ($N_2$) and methane ($CH_4$). Selectivities are described as particularly high for $O_2/N_2$ systems, i.e., a selectivity of about 14 at 25 degrees Celsius (° C.). From this information it can be inferred that the micropore size falls somewhere in a range from the representative molecular diameter of $O_2$ (3.46 Å) to that of $N_2$ (3.64 Å). This CMS membrane is prepared by pre-treating the supported film at 200° C., a temperature at which the PVDC copolymer precursor is melted before carbonization. The fact that melting is required means that the disclosed CMS structures cannot be prepared in unsupported forms.

In other research, including for example, Laredo G. C., Meneses E., Castillo J., Marroquin J. O., Jimeenez-Cruz F., "Adsorption equilibrium and kinetics of branched octane isomers on a polyvinylidene chloride-based carbon molecular sieve," Energy Fuels (2008) 22 (4) 2641-2648, polyvinylidene chloride copolymer-based CMSs have been prepared that exhibit relatively large micropore sizes and pore volumes that are suitable for separation of correspondingly large molecules, i.e., those having a representative molecular diameter greater than 5.0 Å.

More recently, WO/2016/003680 described forming a CMS from PVDC copolymers using a two-step pyrolysis at high temperatures from 800° C. to 1700° C. The CMS formed had an average pore size in the range of 3 Å to 5 Å. These CMS were described as being useful for separating via adsorption propylene ($C_3H_6$) and propane ($C_3H_8$); carbon dioxide ($CO_2$) and nitrogen ($N_2$); $N_2$ and methane ($CH_4$); ethylene ($C_2H_4$) and ethane ($C_2H_6$); and n-butane ($C_4H_{10}$) and i-butane ($C_4H_{10}$).

The gas permeation properties of a membrane can be determined by gas permeation experiments. Two intrinsic properties have utility in evaluating separation performance of a membrane material: its "permeability," a measure of the membrane's intrinsic productivity; and its "selectivity," a measure of the membrane's separation efficiency. One typically determines "permeability" in Barrer (1 Barrer=$10^{-10}$ [$cm^3$ (STP) cm]/[$cm^2$ s cmHg], calculated as the flux ($n_i$) divided by the partial pressure difference between the membrane upstream and downstream ($\Delta p_i$), and multiplied by the thickness of the membrane (l).

$$P_i = \frac{n_i l}{\Delta p_i}$$

Another term, "permeance," is defined herein as productivity of asymmetric hollow fiber membranes and is typically measured in Gas Permeation Units (GPU) (1 GPU=10$^{-6}$ [cm$^3$ (STP)]/[cm$^2$ s cmHg]), determined by dividing permeability by effective membrane separation layer thickness.

$$\left(\frac{P_i}{l}\right) = \frac{n_i}{\Delta p_i}$$

Finally, "selectivity" is defined herein as the ability of one gas's permeability through the membrane or permeance relative to the same property of another gas. It is measured as a unitless ratio.

$$\alpha_{i/j} = \frac{P_i}{P_j} = \frac{(P_i/l)}{(P_j/l)}$$

It would be desirable to provide a method to make an asymmetric carbon molecular sieve that avoids one or more of the aforementioned problems and is useful to separate olefins and their corresponding paraffins (e.g., ethylene/ethane, propylene/propane and butylene/butane). Likewise it would be desirable to provide an asymmetric PVDC membrane that is able to be formed into an asymmetric carbon molecular sieve without suffering from problems such as structural collapse of the support layer adjacent to the separation layer or defects in the separation layer arising during the pyrolysis.

SUMMARY OF THE INVENTION

A first aspect of the invention is a method of making an asymmetric polyvinylidene chloride copolymer membrane comprising,
  (i) providing a dope solution comprised of a polyvinylidene chloride copolymer and a solvent that solubilizes the polyvinylidene chloride copolymer;
  (ii) shaping the dope solution to form an initial shaped membrane;
  (iii) exposing the initial shaped membrane to a quenching liquid comprised of a solvent that is miscible with the solvent that solubilizes the polyvinylidene chloride copolymer but is immiscible with the polyvinylidene chloride copolymer to form a wet asymmetric polyvinylidene chloride (PVDC) copolymer membrane; and
  (iv) removing each of the solvents of step (i) and (iii) to form the asymmetric polyvinylidene chloride copolymer membrane.

The method of the invention may realize a resin asymmetric membrane that when further heated forms an asymmetric carbon molecular sieve membrane that mimics the microstructure of the PVDC membrane that may have desirable productivity and separation of commercially useful gases.

A second aspect of the invention is a method to form an asymmetric carbon molecular sieve membrane comprised of,
  (a) heating the asymmetric PVDC copolymer membrane of the first aspect of the invention to a pretreatment temperature of 100° C. to 180° C. to form a pretreated polyvinylidene chloride copolymer membrane, and
  (b) heating the pretreated polyvinylidene chloride copolymer film to a pyrolysis temperature from 350° C. to 1700° C. to form the carbon molecular sieve membrane.

A third aspect of the invention is a process for separating a gas molecule from a gas feed comprised of the gas molecule and at least one other gas molecule comprising
  (i) providing the carbon molecular sieve membrane of the second aspect of the invention; and
  (ii) flowing the gas feed through said carbon molecular sieve membrane to produce a first stream having an increased concentration of the gas molecule and a second stream having an increased concentration of the other gas molecule.

The asymmetric PVDC membrane or carbon membrane made therefrom may be used to make a gas separating module comprised of: a plurality of asymmetric membranes made by the first or second aspect of the invention contained within a sealable enclosure having an inlet for introducing a gas feed comprised of at least two differing gas molecules wherein said gas feed flows through said membranes such that the gas is separated into a permeate gas stream and a retentate gas stream; a first outlet for permitting egress of a permeate gas stream; and a second outlet for egress of a retentate gas stream.

The gas separation method is useful for separating gas molecules in gas feeds that have very similar molecular sizes such as hydrogen/ethylene, ethane/ethylene and propane/propylene. It may also be used to separate gases from atmospheric air such as oxygen or separating gases (e.g., methane) in natural gas feeds.

DETAILED DESCRIPTION OF THE INVENTION

Figure 1:
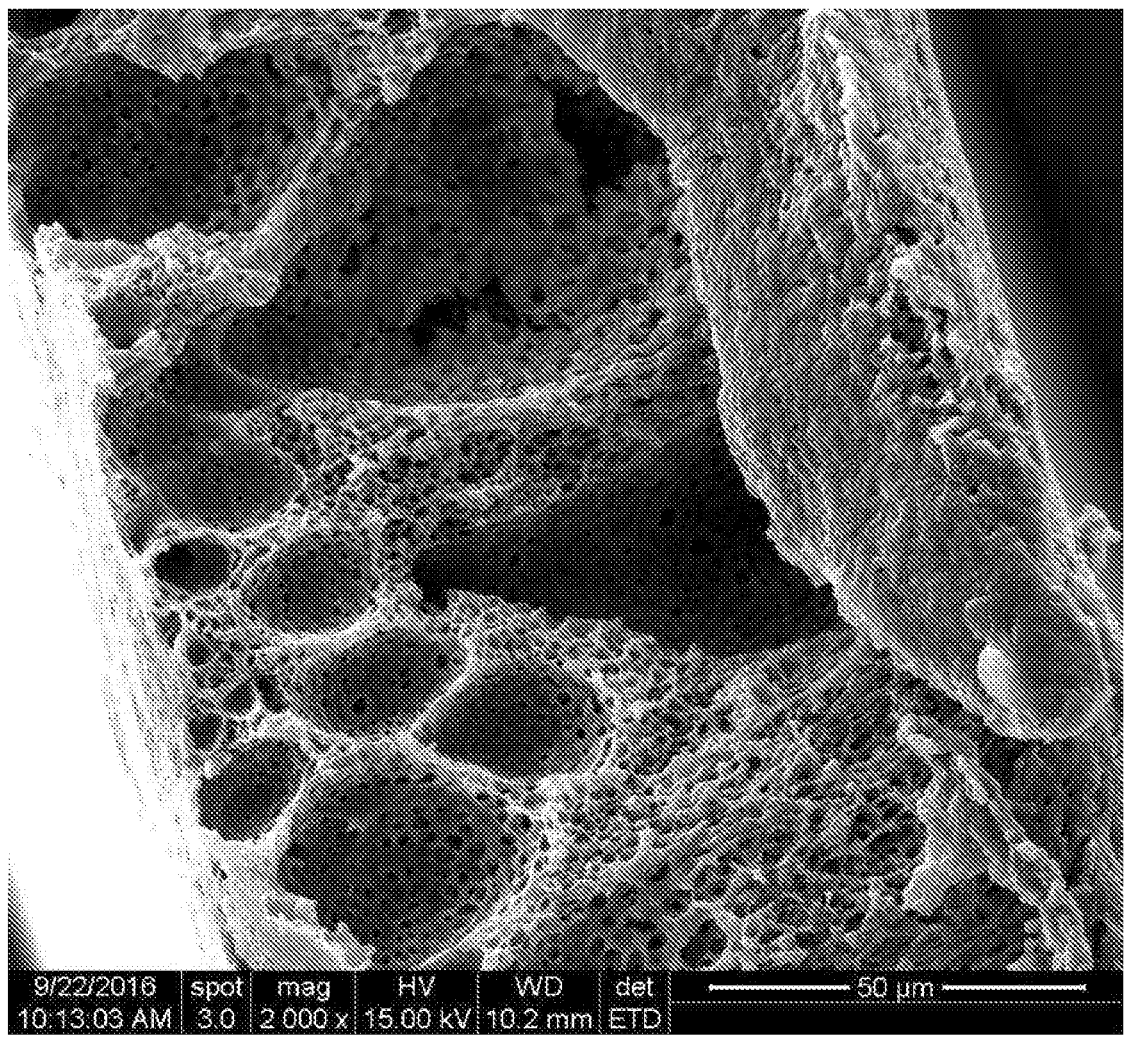
FIG. 1 is a scanning electron micrograph of an asymmetric PVDC copolymer membrane made by the method of this invention.

When making the membrane, conventional procedures known in the art may be used (see, for example U.S. Pat. Nos. 5,820,659; 4,113,628; 4,378,324; 4,460,526; 4,474,662; 4,485,056; 4,512,893 and 4,717,394). Exemplary methods for forming hollow fibers include coextrusion procedures including such as a dry-jet wet spinning process (in which an air gap exists between the tip of the spinneret and the coagulation or quench bath) or a wet spinning process (with zero air-gap distance) may be used.

To make the asymmetric PVDC copolymer membrane a dope solution comprised of a PVDC copolymer and a solvent is used. Typically, when making a thin film membrane a dope solution comprised of a solvent that dissolves the PVDC copolymer is used, for example, when casting onto a flat plate which is then quenched using a quenching liquid. When making a hollow fiber, typically the dope solution is a mixture of a solvent that solubilizes the PVDC copolymer and a second solvent that does not solubilize (or to a limited extent) the PVDC copolymer, but is soluble with the solvent that solubilizes the PVDC copolymer are used. Exemplary solvents that are useful to solubilize the PVDC copolymer include N-Methyl-2-pyrrolidone (NMP), tetrahydrofuran (THF), dimethylacetamide (DMAc) and dimethylformamide (DMF). Exemplary solvents that do not solubilize the PVDC copolymer, but are soluble with the solvents that do solubilize the PVDC copolymer include methanol, ethanol, water, and 1-propanol. Dissolution of the PVDC copolymer in the solvent may be aided by heating, mixing, milling or combination thereof.

The PVDC copolymer may be any useful copolymer of vinylidene chloride monomer and at least one additional comonomer. The comonomer may be selected from a variety of materials, including in particular embodiments a vinyl monomer, vinyl chloride monomer, an acrylate monomer, a methacrylate monomer, a styrenic monomer, acrylonitrile, methacrylonitrile, itaconic acid, chlorotrifluoroethylene, and combinations thereof. In more particular embodiments examples of the vinyl monomers include vinyl chloride, vinyl acetate, acrylonitrile, and combinations thereof. More particular examples of the acrylate monomers include methyl acrylate, ethyl acrylate, butyl acrylate, and combinations thereof. More particular examples of methacrylate monomers include methyl methacrylate, butyl methacrylate, and combinations thereof. A more particular example of styrenic monomers is styrene itself.

In proportion it is preferred that the vinylidene chloride based copolymer, which is herein termed a polyvinylidene chloride (PVDC) copolymer, includes at least 60 wt % of vinylidene chloride, based on total weight of the copolymer, and in more preferred embodiments at least 70 wt %. However, it is further desired that the PVDC contains a maximum of 97 wt % vinylidene chloride, and thus preferably contains a minimum of at least 3 wt % of the comonomer or comonomer combination; more preferably from 3 wt % to 40 wt %; still more preferably from 3 wt % to 30 wt %; and most preferably from 3 wt % to 20 wt %.

Particular embodiments of PVDCs that are suitable for use in the invention are those including as a comonomer an acrylate, such as methyl acrylate, ethyl acrylate, butyl acrylate, or a combination thereof, in an amount from 3 wt % to 20 wt %, based on the weight of the PVDC as a whole; more preferably from 3.5 wt % to 15 wt %; and most preferably from 4 wt % to 12 wt %. Another particular embodiment is a PVDC including vinyl chloride in an amount from 3 wt % to 30 wt %; more preferably from 7 wt % to 28 wt %; and most preferably from 9 wt % to 25 wt %.

It is also preferred that the overall weight average molecular weight (Mw) of the PVDC copolymer ranges from 10,000 to 250,000; more preferably from 50,000 to 200,000; and most preferably from 60,000 to 150,000.

Use of additives in the PVDC copolymer is also contemplated as being within the scope of the invention. Common additives may include, but are not necessarily limited to, epoxidized oil stabilizers such as epoxidized soybean oil, epoxidized linseed oil, and the diglycidyl ether of bisphenol A. Also frequently employed are liquid plasticizers such as aliphatic and aromatic esters, including for example dibutyl sebacate, acetyl tributyl citrate, dioctyl phthalate, and the like, and combinations thereof. Other common additives may include lubricants, such as polyethylene wax, paraffin wax, oxidized polyethylene wax, and combinations thereof. Lubricants may optionally be included, and may comprise, for example, high density polyethylene, acrylate copolymers and silicone polymers, and combinations thereof. Another group of additives that may be included are acid scavengers such as epoxy compounds, magnesium hydroxide, magnesium oxide, tetrasodium pyrophosphate, calcium phosphate, magnesium phosphate, DHT 4A (a synthetic hydrotalcite-like halogen scavenger available from Kyowa Chemical Industry), calcium oxide, calcium carbonate, and combinations thereof. Antioxidants such as phenolics may also be incorporated. Combinations of any or all of these types of additives may be included in the PVDC copolymer.

In proportion, it is preferred that the total amount of all additives combined be no more than 15 wt %, and more preferably no more than 8 wt % or 3 wt %. In many applications, however, an amount of all additives combined of at least 2 wt % may be typical, with use thereof therefore ranging preferably from 2 wt % to 8 wt %, and more preferably from 2 wt % to 3 wt %. Those skilled in the art will be aware of the use of such additives and their indications and contraindications without further direction herein.

Those skilled in the art will also be aware of a variety of means and methods for preparing copolymers. However, in general any of the typical or conventional methods of polymerization, including but not limited to mass polymerization, suspension polymerization, and emulsion polymerization, and preferably suspension polymerization or emulsion polymerization, may be employed. It is generally preferred that polymerization is carried out at a temperature that ensures avoidance of degradation of all of the PVDC components, e.g., preferably from 10° C. to 120° C.; more preferably from 20° C. to 100° C.; and most preferably from 30° C. to 90° C.

It has been discovered to form an asymmetric PVDC copolymer membrane, the crystallinity of the PVDC copolymer generally should be in a range from 25% to 85% of the resin or formed film, as measured by differential scanning calorimetry (DSC) according to ASTM D3418. The range of crystallinity typically allows for the desired asymmetric membrane microstructure to be formed that may be retained upon carbonization to form an asymmetric CMS membrane therefrom as described further below. It is more preferred that this level ranges from 40% to 80%, and most preferred that this level ranges from 50%, 55% or even 60% to 75%. Thus, inclusion of a comonomer generally helps to reduce the crystallinity to ensure the desired range, and also to increase the dissolution and thereby improve processability, but too much may lead to structural collapse or undesirably long dehydrochlorination times during the thermal treatment below the PVDC copolymer melting temperature. In general, inclusion of bulkier monomers may tend to reduce overall copolymer crystallinity by a greater amount than inclusion of less bulky monomers. Thus, for example, butyl acrylate will tend to reduce crystallinity more than, for example, methyl acrylate or ethyl acrylate, assuming such is/are used in the same mole percent (mol %) based on final copolymer composition.

After the dope solution is formed, the solution is shaped into an initial shaped membrane. The method may be any suitable method such as those known in the art and described above.

The initial shaped membrane is exposed to a quenching liquid to form a wet asymmetric PVDC copolymer membrane. Prior to being exposed to the quenching liquid, the initial shaped membrane may first be exposed to a gaseous atmosphere for a short time (a few seconds or fractions of seconds to several minutes). The gaseous atmosphere may be any useful such as air, nitrogen, inert gas or combination thereof and the gaseous atmosphere may be dry or contain moisture.

The quenching liquid may be comprised of a solvent that is miscible with the solvent that solubilizes the polyvinylidene chloride copolymer but is immiscible with the polyvinylidene chloride copolymer at the temperature employed in the process (typically around room temperature and illustratively 10° C. to about 100° C. Miscible herein means that at the concentration of the PVDC copolymer used in the dope solution or quenching liquid, the solvent in the absence of any other solvent would solubilize the PVDC completely at the concentration used or be completely miscible Immiscible herein means that the PVDC or other solvent is essentially immiscible, with it understood that some small amount of miscibility is contemplated (e.g., less than about 1% or 3% by volume solute is solubilized in the solvent). The solvents that may be employed may be one or more combinations of solvents described previously for use in the dope solution. In a particular embodiment, the quenching liquid is comprised of water or a solvent such as ethanol, methanol, hexane, etc. or a combination of the above solvents mentioned.

The initial shaped membrane is exposed to the quenching liquid for a sufficient time to realize the desired asymmetric membrane microstructure (i.e., form the wet asymmetric PVDC copolymer membrane). Illustratively, depending on the process, membrane parameters (e.g., thickness), and desired separation characteristics, the time of exposure may be from several seconds to several days. Practically, in high volume production, it is desirable for the quenching time to be as short as possible and typically would be beneficial to be several seconds or fractions of seconds to 1 hour or less and preferably less than about 10 minutes or several minutes (3 or 5).

Once the wet asymmetric PVDC copolymer membrane is formed, the remaining solvent is removed after the wet asymmetric PVDC copolymer membrane is removed from the quenching liquid to form the asymmetric PVDC copolymer membrane. The wet membrane may be solvent exchanged before final solvent removal. The solvent may be removed by any suitable method such as those known in the art. Exemplary methods include evaporation and sublimation or the like. Such removal may be accelerated by the application of heat by any useful method, such as application of vacuum, gas flow or one or more combinations occurring simultaneously or sequentially.

In a particular embodiment, the membrane is an asymmetric hollow fiber that has a wall that is defined by an inner surface and outer surface of said fiber and the wall has an inner porous support region extending from the inner surface to an outer microporous separation region that extends from the inner porous support region to the outer surface. The hollow fiber generally has an outer microporous separation layer having a thickness of at most 10% of the wall extending from the inner surface to the outer surface. The outer separation layer typically has a thickness of 0.05 micrometers to 15 micrometers, desirably 0.05 micrometers to 5 micrometers, more desirably 0.05 to 1 micrometer. Herein, microporous shall mean pores that are less than 2 nm in diameter; mesoporous shall mean pores of 2-50 nm in diameter and macroporous shall mean pores greater than 50 nm in diameter. The microstructure of the separation layer is generally characterized by the presence of microporous pores with it being understood that there may be occasional larger pores, but these tend to be few and undesired and tolerable to the extent they do not substantially degrade the separation performance of the entire membrane. The support layer is generally characterized by a microstructure where the pores are mesoporous, macroporous or both. It is understood that the separation layer in the CMS membrane corresponds to a dense polymer layer in the asymmetric PVDC copolymer membrane.

In a particular embodiment, the asymmetric PVDC copolymer membrane has been discovered to be particularly useful to form an asymmetric carbon molecular sieve membrane by further heating the asymmetric PVDC copolymer membrane. The asymmetric polyvinylidene chloride copolymer membrane is first heated to a pretreatment temperature of 100° C. to 180° C. to form a pretreated polyvinylidene chloride copolymer membrane. The pretreated membrane is then further heated to a pyrolysis temperature from 350° C. to 1700° C. to form the asymmetric carbon molecular sieve membrane.

Generally the pre-treatment is used to stabilize, or "lock," the copolymer structure prior to carbonization thereof. In this step the PVDC film or fiber are heated, below the melting temperature thereof (typically less than about 180° C., depending upon the exact composition of the precursor), in order to dehydrochlorinate the film to the extent of at least 10%. As used herein, the term "at least 10% dehydrochlorinated" means that the film or fiber has been pre-treated, by removing hydrogen chloride, to a point at which the PVDC copolymer film or fiber no longer melts and, in fact, begins to become infusible. It is well-accepted in the art that such a change in molecular kinetics begins to occur at a point of approximately 10% dehydrochlorination and is completed or maintained as the level of dehydrochlorination increases above that point. This step is termed a "pre-treatment" because it occurs prior to a pyrolysis step, which is the treatment step wherein carbonization is accomplished.

During the pre-treatment the copolymer structure's temperature is preferably maintained in a range of from 100° C. to 180° C., more preferably from 120° C. to 160° C., and most preferably from 130° C. to 150° C. This is preferably done in air for convenience, but other atmospheres, such as $N_2$ and other inert gases or oxidizing gases such as $CO_2$, or combinations thereof, may also or alternatively be used, since generally only minor levels of oxidation of the copolymer are anticipated within the overall given temperature range. Achievement of the desired dehydrochlorination, that is responsible for the formation of the locked structure, may be accomplished by exposure to a source of high energy irradiation, such as gamma rays, an electron beam, ultraviolet light, or a combination thereof. The time may vary from 1 hour (hr) to 48 hr, preferably from 1 hr to 24 hr, and most preferably from 1 hr to 12 hr, as needed to reach at least 10% dehydrochlorination point, at which the copolymer begins to become infusible, i.e., no longer able to be melted. The dehydrochlorination degree can vary from 5% to 100%, depending upon pretreatment temperature and time. Where more than visual confirmation of the beginning of infusibility is desired, additional confirmation of the percentage of dehydrochlorination may be obtained by means of, for example, Thermo Gravimetric Analysis (TGA), using standard and well-known methods and equipment.

During the pre-treatment the fiber or film may be restrained to maintain its shape and desirably is. The particular restraining method may be any known in the art and may be held in tension or compression. In a particular embodiment, particularly for films, they are restrained by applying a compressive force. In particular the film is placed between two flat substrates that may be impervious or pervious to gases including the HCl being removed. Illustratively, the film may be constrained between two low surface energy plates (e.g., TEFLON plates or sheets), which are further interposed between two metal, ceramic or graphite plates. Alternatively, the plates may be pervious to gases such as the HCl being removed from the PVDC copolymer and may include, for example, honeycomb structures. The amount of tension or compression may be any useful amount, but typically may range from 0.01 MPa to 10 MPa, from 0.1 to 1 MPa, or from 0.1 to 0.5 MPa. In the same manner, the restraining during pyrolysis (carbonization)

may be performed in the same fashion with similar substrates, which can withstand the maximum pyrolysis temperatures used.

Following the dehydrochlorination pre-treatment, the pre-treated film or pre-treated fiber is pyrolyzed. As already pointed out hereinabove, this pyrolysis is also termed "carbonization," because the result thereof is that the copolymer is converted to the carbon-only, or near carbon-only, skeleton of its copolymer structure, i.e., all or virtually all atoms other than carbon have been removed, but the carbon-carbon bonds remain substantially intact, and the CMS may now be termed to be "carbonaceous." The pyrolysis may be carried out using any means generally known to those skilled in the art, but may be carried out at an attained maximum temperature within the range of from 350° C. to 1700° C. Desirably, the temperature is at least 400° C., 450° C. to at most 1200° C., 1000° C., 700° C., 650° C., 600° C. or 550° C.

The atmosphere during the carbonization may be any useful for forming the carbon molecular sieve membranes. Exemplary atmospheres include any non-oxidizing gas such as nitrogen, an inert gas (e.g., noble gas), hydrogen, carbon monoxide, vacuum (e.g. less than 0.1 millibar) or combinations thereof. The atmosphere may be varied during the heating and may include small amounts of oxygen as described below. In one embodiment the pyrolysis utilizes a controlled purge gas atmosphere during pyrolysis in which low levels of oxygen are present in an inert gas. By way of example, an inert gas such as argon is used as the purge gas atmosphere. Other suitable inert gases include, but are not limited to, nitrogen, helium, or any combinations thereof. By using any suitable method such as a valve, the inert gas containing a specific concentration of oxygen may be introduced into the pyrolysis atmosphere. For example, the amount of oxygen in the purge atmosphere may be less than about 50 ppm (parts per million) O2/Ar. Alternatively, the amount of oxygen in the purge atmosphere may be less than 40 ppm $O_2$/Ar. Embodiments include pyrolysis atmospheres with about 8 ppm, 7 ppm, or 4 ppm $O_2$/Ar during a portion or the entire time of the heating.

In a particular embodiment, the asymmetric PVDC copolymer membrane forms an asymmetric hollow fiber carbon molecular sieve having a wall that is defined by an inner carbon membrane surface and outer carbon membrane surface of said fiber and the wall has an inner carbon porous support region extending from the inner carbon surface to an outer carbon microporous separation region that extends from the inner carbon porous support region to the outer carbon surface. It has been discovered that the use of the asymmetric PVDC copolymer membrane avoids structural collapse illustratively of a portion of the support layer adjacent to the outer separation region of the asymmetric hollow fiber, which effectively increases the separation layer thickness. Generally, this means that the corresponding separation layer in the asymmetric PVDC copolymer fiber when pyrolyzed to make the hollow CMS fiber, the separation layer in the hollow fiber CMS has a thickness that is within 100%, 75%, 50%, 25%, or 10% of the corresponding separation (dense) layer of the PVDC copolymer fiber. Illustratively, if the PVDC copolymer separation layer is 5 micrometers, the corresponding CMS fiber separation layer thickness may be 10, 8.75, 7.5, 6.25 or 5.5 micrometers. Desirably the CMS separation layer may be essentially (within 5% or less) the same thickness as the corresponding PVDC copolymer separation layer.

The asymmetric CMS membranes formed from the asymmetric PVDC copolymer membranes are particularly suitable for separating gases that are similar in sizes such as described previously and involve flowing a gas feed containing a desired gas molecule and at least one other gas molecule through the membrane. The flowing results in a first stream have an increased concentration of the desired gas molecule and second stream having an increased concentration of the other gas molecule. The process may be utilized to separate any number of gas pairs and in particular is suitable for separating hydrogen from ethylene, ethane, propylene, propylene or mixture thereof or hydrogen from any low molecular weight hydrocarbon, nitrogen, oxygen, $CO_2$ or air. When practicing the process, the membrane is desirably fabricated into a module comprising a sealable enclosure comprised of a plurality of asymmetric CMS membranes that is comprised of at least one asymmetric CMS membrane produced by the method of the invention that are contained within the sealable enclosure. The sealable enclosure having an inlet for introducing a gas feed comprised of at least two differing gas molecules; a first outlet for permitting egress of a permeate gas stream; and a second outlet for egress of a retentate gas stream.

EXAMPLES

Examples 1-5

The commercial PVDC resin shown in Table 1 were mixed with, n-methyl-pyrrolydone at a 30%/70% weight ratio. During mixing, the mixture was heated to ~60-80° C. to accelerate the polymer dissolution. Once dissolved the mixing was stopped and the solution cooled to room temperature. The prepared polymer solution was poured onto glass plate and cast using a knife set with a gap between the knife and plate set at 10 mil (~254 micrometers). Thirty seconds after casting the dope solution, the glass plate with the casting was immersed into a water bath at room temperature for 1-3 days to form the asymmetric PVDC copolymer membrane. The asymmetric PVDC copolymer membrane was taken out of the water bath and air dried at ambient conditions (~23° C.) overnight (at least about 12 hours).

One inch (25.4 mm) disks were cut out of the asymmetric PVDC copolymer membrane for carbonization. Twelve disks were treated simultaneously in a two-step process. For the initial low temperature pretreatment, 12 disks (1 inch diameter) were sandwiched between ceramic honeycomb plates, through which the HCl generated may be removed easily. The weight of each ceramic honeycomb plate was about 0.1 kg. A scrubber connected to the heating oven was used to neutralize the HCl generated. The scrubber was comprised of a 10 wt % sodium hydroxide aqueous solution. The oven was heated at 1° C./min to 130° C. and held for 24 hour under a 2 L/min of air purge. For the second heating step (carbonization), the 12 pretreated disks were sandwiched between the ceramic honeycomb plates and loaded into a nitrogen purged 5.5" OD quartz tube furnace. A scrubber connected to this furnace contained a 10 wt % sodium hydroxide aqueous solution. The furnace was raised to a final temperature of 500° C. at a ramp rate of 3° C./min, and held for 30 minutes at the final temperature, then cooled down to room temperature (~25° C.). After cooling down, the carbon membranes were put into storage box continuously purged with dry nitrogen at a flow rate of 5 Liters/min.

Figure 2:
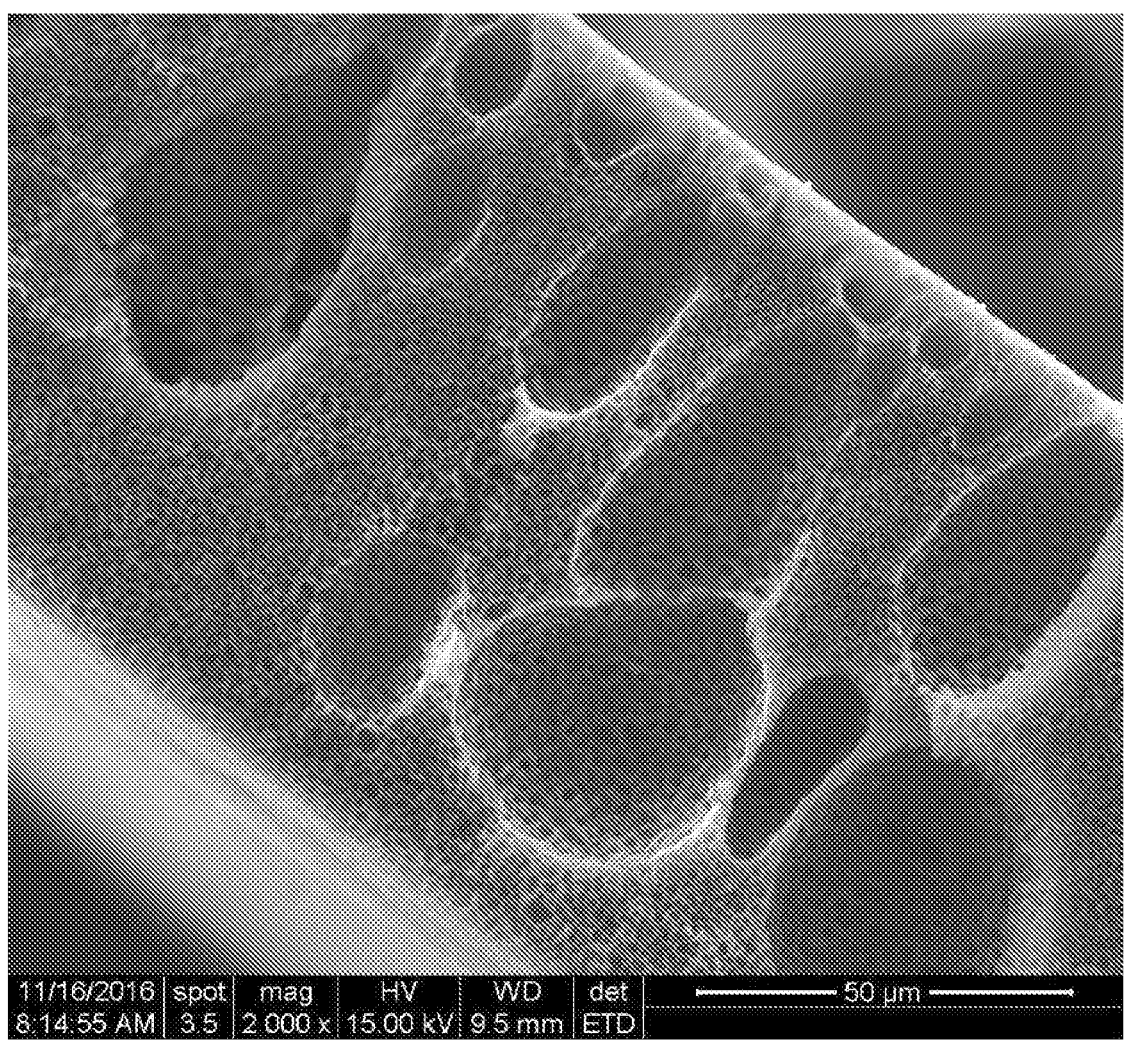
FIG. 2 is a scanning electron micrograph of the corresponding asymmetric carbon molecular sieve membrane made from asymmetric PVDC copolymer membrane of FIG. 1.

The structure of the asymmetric PVDC copolymer membranes and the resulting carbon molecular sieve (CMS) membranes were examined using SEM (Scanning Electron Microscopy) to analyze the asymmetric structure and film densification during the thermal treatment: pre-treatment and pyrolysis. As shown in Table 1, the polymer films with lower comonomer content and higher crystallinity (copolymer with 4.8 wt % methyl acrylate and copolymer with 5.5 wt % butyl acrylate) showed less densification and maintained the asymmetric morphology. Illustratively, the asymmetric PVDC copolymer membrane of Example 3 is shown in FIG. 1 and its corresponding CMS membrane is shown in FIG. 2. From these Figures, it is readily apparent that the CMS structure mimics the structure of the PVDC copolymer without a change in the thickness of the CMS separation layer. This is believed to be due to the high peak melting temperatures of Examples 1-3, which are significantly higher than the pretreatment temperature of 130° C. One may lower the pretreatment temperature to reduce the melting/densification during the pretreatment, to avoid structural collapse of the supporting layer. However, there would be expected tradeoff in the rate of dehydrochlorination being reduced. The 17.6 wt % (average content) vinyl chloride copolymer has a compositional drift during copolymerization because vinyl chloride monomer tends to react faster than the vinylidene chloride. Therefore, it is a mixture of different copolymers with a vinyl chloride comonomer content in the range of 3 to 90 weight percent. The densification during thermal treatment was avoided presumably because of this compositional drift: the component with lower vinyl chloride (with higher melting temperature) may have prevented the densification.

TABLE 1

| Example | Comonomer | Supplier | DSC peak melting[#] [° C.] | DSC crystallinity | Structural Collapse* |
|---|---|---|---|---|---|
| 1 | 4.8 wt % methyl acrylate | Dow | 167.4 | 67% | No |
| 2 | 5.5 wt % butyl acrylate | Dow | 166.9 | 77% | No |
| 3 | 17.6 wt % vinyl chloride | Dow | 151.0 | 60% | No |
| 4 | 8.5 wt % methyl acrylate | Dow | 157.5 | 51% | Yes |
| 5 | (Unknown) R204 | Asahi | 148.4 | 35% | Yes |

[#]The DSC cell with 10 mg polymer sample was equilibrated at room temperature for 10 seconds before heated to 200° C. at 10 C./min. The peak melting temperature is the temperature of maximum heat flow.
*Structural Collapse means the separation layer thickness in the final carbon asymmetric membrane is more than twice the thickness of the separation layer of the asymmetric PVDC copolymer membrane, as measured through the cross-sectional SEM micrographs.

Example 6

A PVDC copolymer asymmetric membrane was made in the same manner as Example 1 except that the solvent used to form the polymer solution was comprised of n-methylpyrrolydone (NMP), tetrahydrofuran (THF) in the following proportions (polymer/NMP/THF) 34%/50%/16% weight ratio. Instead of waiting 30 seconds after casting the solution, 10 seconds was used. The crystallinity of the cast film was about 45%, which is lower than that of the as-polymerized resins, which may be due to the inhibition of crystallization by the large molecular weight of the polymer.

The pre-treatment and carbonization to form the asymmetric CMS membranes were performed in the same manner as Example 1.

Three CMS membranes were masked onto a standard 25 mm filter holder (Millipore #4502500, EMD Millipore Corp., Germany) using an impermeable aluminum tape, leaving open a defined permeation area. The three CMS membranes were designated 6A, 6B and 6C. A two-part epoxy (J-B Weld twin tube) was then applied along the interface of the tape and the carbon membranes. Mixture gases were tested at 20° C. with a continuous feed at the upstream (25 sccm hydrogen, 25 sccm carbon dioxide, 25 sccm methane, total 1 atm) and He purge at the downstream (2.0 sccm, 1 atm). The permeate carried by the He purge gas was analyzed by GC (gas chromatograph) with a TCD (thermal conductivity detector for $H_2$ and $CO_2$) and FID (flame ionization detector for $CH_4$ and other hydrocarbons). The concentrations in all cases were lower than 5%, so the gas flow rate in downstream was considered the same as the He flow rate. The permeate rate was calculated using the He purge flow rate times the permeate concentrations measured by GC. The order of testing was kept in the order of $H_2$, $CO_2$, and $CH_4$. The tests were run for several hours to days until the permeate concentrations were steady (reached an equilibrium). The permeation results of these tests are shown in Table 2. The gas permeation results of Example 6A is shown in Table 3 for $C_2H_4$, $C_2H_6$, $C_3H_6$, and $C_3H_8$ gases. The permeance of these gases were determined by flowing a 60 sccm of mixture gas containing equimolar amount of each of the four gases in the same manner as described above. The permeance of $n-C_4H_{10}$ and $i-C_4H_{10}$ were determined by flowing a 20 sccm of mixture gas containing equimolar amount of the two gases in the same manner as above and the permeance for these gases for Examples 6A are also shown in Table 3.

TABLE 2

| CMS membrane | $H_2$ permeance [GPU] | $CO_2$ permeance [GPU] | $CH_4$ permeance [GPU] | $CO_2/CH_4$ selectivity [—] |
|---|---|---|---|---|
| Ex. 6A | 265.3 | 521.5 | 13.4 | 38.9 |
| Ex. 6B | 423.7 | 567.9 | 13.5 | 42.1 |
| Ex. 6C | 359.8 | 449.5 | 11.2 | 40.1 |

TABLE 3

| Gas | Permeance [GPU] |
|---|---|
| $H_2$ | 265.3 |
| $CO_2$ | 521.5 |
| $CH_4$ | 13.4 |
| $C_2H_4$ | 12.2 |
| $C_2H_6$ | 4.1 |
| $C_3H_6$ | 7.8 |
| $C_3H_8$ | 2.2 |
| $nC_4H_{10}$ | 1.0 |
| $iC_4H_{10}$ | 1.0 |

The CMS membrane of this invention has a surprisingly high permeance for $CO_2$, even though it is larger than $H_2$. It is unclear why this behavior results, but may be due to the unique structures that arise when making asymmetric CMS membranes from asymmetric PVDC copolymer membranes. This unique structure may due to the PVDC copolymer's ability to lock in the asymmetric structure of PVDC copolymer membrane during dehydrochlorination prior to carbonization as well as formation of unique structures within the separation due to the evolution of HCl during dehydrochlorination.

What is claimed is:
1. A method of making an asymmetric polyvinylidene chloride copolymer membrane, the method comprising:

(i) providing a dope solution comprised of a polyvinylidene chloride copolymer and a solvent that solubilizes the polyvinylidene chloride copolymer;

(ii) shaping the dope solution to form an initial shaped membrane;

(iii) exposing the initial shaped membrane to a quenching liquid comprised of a solvent that is miscible with the solvent that solubilizes the polyvinylidene chloride copolymer but is immiscible with the polyvinylidene chloride copolymer to form a wet asymmetric polyvinylidene chloride copolymer membrane; and (iv) removing each of the solvents of step (i) and (iii) to form the asymmetric polyvinylidene chloride copolymer membrane, wherein the polyvinylidene chloride copolymer has an amount of comonomer of 3% to 20% by weight of the polyvinylidene chloride copolymer, wherein the comonomer is one or more of the following: a vinyl monomer; a vinyl chloride monomer; an acrylate monomer; a methacrylate monomer; a styrenic monomer; acrylonitrile, methacrylonitrile; itaconic acid; chlorotrifluoroethylene, and wherein the polyvinylidene chloride copolymer has a crystallinity ranging from 60% to 85%, as measured by differential scanning calorimetry (DSC) according to ASTM D3418.

2. The method of claim 1, wherein the dope solution is comprised of a solvent that is immiscible with polyvinylidene chloride copolymer and miscible with the solvent that solubilizes the polyvinylidene chloride copolymer.

3. The method of claim 1, wherein, prior to exposing the initial shaped membrane to the quenching liquid, the initial shaped membrane is exposed to a gaseous atmosphere.

4. The method of claim 1, wherein the polyvinylidene chloride copolymer is a copolymer of vinylidene chloride and at least one comonomer.

5. The method of claim 1, wherein the asymmetric polyvinylidene chloride copolymer membrane is an asymmetric hollow fiber that has a wall that is defined by an inner surface and outer surface of said fiber and the wall has an inner porous support region extending from the inner surface to an outer separation region that extends from the inner porous support region to the outer surface.

6. The method of claim 1, wherein outer region has a thickness of 0.05 micrometers to 15 micrometers.

7. The method of claim 6, wherein the outer region has a thickness of 0.05 micrometer to 5 micrometers.

8. The method of claim 1, further comprising:
(a) heating the asymmetric polyvinylidene chloride copolymer membrane a pretreatment temperature of 100° C. to 180° C. to form a pretreated asymmetric polyvinylidene chloride copolymer membrane; and
(b) heating the pretreated polyvinylidene chloride copolymer membrane to a pyrolysis temperature from 350° C. to 1700° C. to form an asymmetric carbon molecular sieve membrane.

9. The method of claim 8, wherein the pyrolysis temperature is 400° C. to 1000° C.

10. The method of claim 8, wherein the asymmetric carbon molecular sieve membrane is an asymmetric hollow fiber carbon molecular sieve having a wall that is defined by an inner carbon membrane surface and outer carbon membrane surface of said fiber and the wall has an inner carbon porous support region extending from the inner carbon surface to an outer carbon microporous separation region that extends from the inner carbon porous support region to the outer carbon surface.

11. The method of claim 8, wherein the outer separation region has a thickness of at most 10% of thickness of the wall extending from the inner surface to the outer surface.

12. The method of claim 8, wherein the outer region has a thickness of 0.05 micrometers to 15 micrometers.

13. The method of claim 8, wherein the outer carbon region thickness is within 20% of the outer region of the corresponding asymmetric polyvinylidene chloride copolymer membrane.

14. A process for separating a gas molecule from a gas feed comprised of the gas molecule and at least one other gas molecule, the process comprising:
(i) providing the carbon molecular sieve membrane produced by any one of claims 9 to 13; and
(ii) flowing the gas feed through said carbon molecular sieve membrane to produce a first stream having an increased concentration of the gas molecule and a second stream having an increased concentration of the other gas molecule.

15. The process of claim 14, wherein the gas molecule and other gas molecule is: hydrogen and ethylene; ethylene and ethane; propylene and propane; oxygen and nitrogen; hydrogen and methane; or carbon dioxide and methane.

16. The process of claim 15, wherein the gas molecule and other gas molecule is hydrogen and ethylene; ethylene and ethane; or propylene and propane.

* * * * *